(12) United States Patent  
Hirata et al.

(10) Patent No.: US 9,019,609 B2
(45) Date of Patent: Apr. 28, 2015

(54) CONTINUOUS ROLL OF OPTICAL FUNCTION FILM, METHOD OF MANUFACTURE OF LIQUID CRYSTAL DISPLAY ELEMENT EMPLOYING SAME, AND OPTICAL FUNCTION FILM LAMINATING DEVICE

(75) Inventors: Satoshi Hirata, Ibaraki (JP); Seiji Umemoto, Ibaraki (JP); Seiji Kondo, Ibaraki (JP); Takuya Nakazono, Ibaraki (JP)

(73) Assignee: Nitto Denko Corporation, Ibaraki-shi (JP)

( * ) Notice: Subject to any disclaimer, the term of this patent is extended or adjusted under 35 U.S.C. 154(b) by 164 days.

(21) Appl. No.: 13/814,867

(22) PCT Filed: Aug. 9, 2011

(86) PCT No.: PCT/JP2011/068159
§ 371 (c)(1),
(2), (4) Date: Feb. 7, 2013

(87) PCT Pub. No.: WO2012/026326
PCT Pub. Date: Mar. 1, 2012

(65) Prior Publication Data
US 2013/0135729 A1 May 30, 2013

(30) Foreign Application Priority Data
Aug. 27, 2010 (JP) ................................. 2010-191104

(51) Int. Cl.
*G02B 27/28* (2006.01)
*G02B 5/30* (2006.01)
(Continued)

(52) U.S. Cl.
CPC .............. *G02B 5/30* (2013.01); *B29D 11/0073* (2013.01); *B29D 11/00788* (2013.01);
(Continued)

(58) Field of Classification Search
CPC ................. G02F 1/133528; G02F 1/133305; B32B 2037/268; B32B 38/04; B29D 11/00644; B29D 11/0073
USPC ........................... 359/483.01–494.01, 492.01
See application file for complete search history.

(56) References Cited

U.S. PATENT DOCUMENTS

2002/0012761 A1  1/2002  Carlson et al.
2003/0152717 A1*  8/2003  Kawahara et al. ........... 428/1.31
(Continued)

FOREIGN PATENT DOCUMENTS

CN  1213311 C  8/2005
CN  101080467 A  11/2007
(Continued)

OTHER PUBLICATIONS

Translation of the International Preliminary Report on Patentability (PCT/ISA/237) (4 pages), (PCT/IB/373) (1 page) of International Application No. PCT/JP2011/068159 mailed Mar. 28, 2013 (Form PCT/IB/338) (1 page).
(Continued)

*Primary Examiner* — Jennifer L Doak
*Assistant Examiner* — Ryan Dunning
(74) *Attorney, Agent, or Firm* — Westerman, Hattori, Daniels & Adrian, LLP

(57) ABSTRACT

An objective of the present invention is to alleviate streaky display unevenness that occurs in liquid crystal display elements when feeding optical function film from a continuous roll having score lines in the width direction thereof and bonding the optical function film on a liquid crystal panel. A continuous roll comprises an optical film laminate (15) that is in the form of a continuous web wound into a roll and comprises at least an optical function film (10) and a carrier film (13) releasably placed on the optical function film (10). The optical function film (10) is divided into a plurality of cut pieces by score lines (16) formed along a widthwise direction of the optical film laminate (15). It is possible to resolve the problem by making the bending rigidity per unit longitudinal length of the optical function film fall within a specific range.

10 Claims, 7 Drawing Sheets

(51) Int. Cl.
*B29D 11/00* (2006.01)
*B32B 37/18* (2006.01)
*B65H 41/00* (2006.01)
*G02F 1/13* (2006.01)
*B65H 18/28* (2006.01)
*G02F 1/1335* (2006.01)

(52) U.S. Cl.
CPC ......... *B32B 37/18* (2013.01); *B32B 2457/202* (2013.01); *B65H 41/00* (2013.01); *B65H 2701/194* (2013.01); *B65H 2801/61* (2013.01); *G02B 5/3041* (2013.01); *G02F 1/1303* (2013.01); *B65H 18/28* (2013.01); *B65H 2301/4127* (2013.01); *G02F 1/133528* (2013.01); *G02F 2201/50* (2013.01); *G02F 2201/54* (2013.01); *G02F 2202/28* (2013.01)

(56) References Cited

U.S. PATENT DOCUMENTS

| | | | |
|---|---|---|---|
| 2008/0265355 A1* | 10/2008 | Yoshizawa et al. | 257/433 |
| 2009/0199950 A1 | 8/2009 | Kitada et al. | |
| 2009/0218049 A1* | 9/2009 | Kanbara et al. | 156/511 |
| 2009/0252932 A1 | 10/2009 | Kitano et al. | |
| 2009/0260738 A1* | 10/2009 | Kitada et al. | 156/64 |
| 2010/0157195 A1* | 6/2010 | Miyatake et al. | 349/62 |
| 2010/0283943 A1* | 11/2010 | Kimura et al. | 349/96 |
| 2010/0288420 A1 | 11/2010 | Kimura et al. | |
| 2010/0288441 A1 | 11/2010 | Kitada et al. | |
| 2010/0316817 A1 | 12/2010 | Kimura et al. | |
| 2011/0117331 A1* | 5/2011 | Mikkelsen | 428/195.1 |
| 2012/0160420 A1 | 6/2012 | Kimura et al. | |
| 2012/0180930 A1 | 7/2012 | Kimura et al. | |
| 2012/0211167 A1 | 8/2012 | Kimura et al. | |
| 2012/0216937 A1 | 8/2012 | Kimura et al. | |

FOREIGN PATENT DOCUMENTS

| | | |
|---|---|---|
| JP | 55-120005 A | 9/1980 |
| JP | 2002-022957 A | 1/2002 |
| JP | 2009-061498 A | 3/2009 |
| JP | 2009-242059 A | 10/2009 |
| JP | 4377965 B1 | 12/2009 |

OTHER PUBLICATIONS

International Search Report for PCT/JP2011/068159, mailing date of Nov. 22, 2011.

Chinese Office Action dated Sep. 22, 2014, issued in corresponding Chinese Application No. 201180040139.3; w/English Translation. (23 pages).

* cited by examiner

CONTINUOUS ROLL OF OPTICAL FUNCTION FILM, METHOD OF MANUFACTURE OF LIQUID CRYSTAL DISPLAY ELEMENT EMPLOYING SAME, AND OPTICAL FUNCTION FILM LAMINATING DEVICE

TECHNICAL FIELD

The invention relates to a continuous roll including an optical film laminate that is wound into a roll and includes a laminate of an optical function film and a carrier film. The invention also relates to a method for manufacturing a liquid crystal display device by feeding the optical film laminate from the continuous roll and bonding the optical film to a liquid crystal panel, and to a laminating device for use in the manufacturing method.

BACKGROUND ART

Flat panel displays typified by liquid crystal displays are used in a wide field, taking advantage of their characteristics such as thin, lightweight, and low power consumption characteristics. A liquid crystal display panel as a component of a liquid crystal display includes a liquid crystal cell and at least one polarizing film bonded thereto, in which a display is produced with polarized light by converting a change in the orientation of liquid crystal molecules to a change in viewing angle under an electric field. Therefore, the process of bonding the polarizing film to the liquid crystal cell requires high accuracy of position and angle. Thus, alignment is generally performed in the bonding process.

A conventional process of bonding an optical function film such as a polarizing film to a liquid crystal panel is performed using a piece of film, which is obtained by cutting, into a piece of a size corresponding to the cell size, an optical function film material in the form of a long continuous web. For the bonding of such a piece, a film manufacturer generally produces a piece of optical function film, inspects the piece, performs end face working of the piece, performs clean packaging of the piece, and transports the packaged piece to a panel manufacturer, who unpacks the piece and then bonds it to a liquid crystal cell. Unfortunately, such a bonding process needs inspecting, packaging, and unpacking each piece of optical function film, and therefore increases the manufacturing cost. Such a process also needs to repeat alignment of a liquid crystal panel and the bonding operation every time a piece of optical function film is bonded, which has a problem in that the tact time in the bonding process is long so that the productivity is low.

In view of such a problem, Patent Documents 1 and 2 propose that a series of steps should be performed, which include providing an optical film laminate that is in the form of a continuous web and includes an optical function film and a carrier film attached to one principal surface of the optical function film, cutting the optical function film at predetermined intervals along the longitudinal direction while leaving the carrier film of the laminate uncut, then peeling off the carrier film from the optical function film, and bonding the exposed surface of the optical function film to a liquid crystal panel.

FIG. 9 shows an example of the optical function film laminating device disclosed in Patent Document 2. The device of FIG. 9 includes a feeder 401 for feeding an optical film laminate, on which a continuous roll 350 including an optical film laminate 315 wound into a roll is mounted. The optical film laminate 315 is continuously fed from the continuous roll, and a cutting apparatus 403 cuts only the optical function film 310 into pieces of a predetermined length along the longitudinal direction while leaving the carrier film 313 uncut (hereinafter, such a method of cutting only the optical function film is called "half-cutting" as needed). A carrier film peeling apparatus 404 peels off the optical function film 310 from the carrier film 313, and in a laminating device 405, the exposed surface of the optical function film 310 peeled off from the carrier film 313 is bonded to a liquid crystal panel W supplied from a liquid crystal panel feeder 408 through another path.

When the optical function film feed path is provided with an inspection apparatus 402, any appropriate defect detection means 420 is used to detect any defects of the optical function film or markings attached to defective parts. Based on the information about the detected defect or marking position, the cutting apparatus can make the longitudinal length of cut pieces different between the defective part with any defect and the non-defective part with no defect, or the laminating device 405 can be controlled so that the defective part will not be bonded to the liquid crystal panel, which can increase the optical function film-use efficiency or the bonding efficiency.

In the apparatus of FIG. 9, accumulator rollers 407a and 407b are provided upstream and downstream of the cutting apparatus 403, respectively. Therefore, while an optical film laminate feeder 401 continuously feeds the optical function film and a carrier film take-up apparatus 406 continuously takes up the carrier film, the feeding of the film can be stopped in the cutting apparatus 403 when the film is cut by the cutting apparatus 403.

According to such a bonding method, feeding the film from the continuous roll 350 including the optical film laminate 315 wound into a roll, cutting the optical function film, and bonding the optical function film to a liquid crystal panel can be automatically and continuously performed in a series of steps, so that the bonding process time can be significantly reduced. On the other hand, such a method has a problem in that the control of the system is complicated, because the cutting step in which half-cutting is carried out by the cutting apparatus 403 and the bonding step in which the optical function film 310 and the liquid crystal panel W are bonded together by the laminating device 405 are in series. In addition, the cutting step involves stopping the feeding of the film, cutting the film, and resuming the feeding, and therefore is a bottleneck in reducing the tact time.

On the other hand, Patent Document 3 discloses a continuous roll of an optical film laminate in the form of a continuous web, which has previously undergone a defect inspection and includes an optical function film with score lines each formed along the widthwise direction. If the continuous roll with score lines formed by half-cutting in advance is mounted on a supporting unit 212 of an optical film laminate feeder 201 shown in FIG. 7 and used in successive bonding of the optical function film and the liquid crystal panel, there is no need to perform, in series, the bonding step and the cutting step, which is the rate-determining step in such a bonding method as disclosed in Patent Document 2. Therefore, the use of such a scored continuous roll as disclosed in Patent Document 3 can further reduce the process time, as compared to such a bonding method as disclosed in Patent Document 2.

PRIOR ART DOCUMENTS

Patent Documents

Patent Document 1: JP-A-55-120005
Patent Document 2: JP-A-2009-61498
Patent Document 3: JP-B1-4377965

SUMMARY OF THE INVENTION

Problems to be Solved by the Invention

As a result of an attempt to perform a bonding process using such a scored continuous roll as disclosed in Patent Document 3, it has been found that in some cases, the product yield decreases due to the occurrence of streaky display unevenness in a liquid crystal display device having a liquid crystal panel and an optical function film bonded thereto and that the incidence of streaky display unevenness is high, particularly when there is a long time interval between the winding of the scored optical film laminate into a roll and the subjecting of the laminate to the bonding process. Such a tendency is more significant when the protective film is placed on only one principal surface of the polarizer in the polarizing film formed into the scored continuous roll.

The invention has been accomplished in view of the above circumstances, and an object of the invention is to provide a continuous roll of a scored optical function film, which hardly causes a reduction in quality when a polarizing film including a polarizer and a protective film placed on only one principal surface of the polarizer is bonded to a liquid crystal panel, and can provide a high efficiency for bonding to a liquid crystal panel.

Means for Solving the Problems

As a result of earnest studies to solve the problems, the invention has been accomplished based on the finding that when the bending rigidity of the optical function film falls within a specific range, the occurrence of streaky irregularities is suppressed in the process of bonding the optical function film to the liquid crystal panel.

The invention is directed to a continuous roll 50 including an optical film laminate 15 that is in the form of a continuous web wound into a roll and includes at least an optical function film 10 and a carrier film 13 releasably placed on the optical function film 10. The optical function film 10 is divided into a plurality of cut pieces by score lines 16 formed along the widthwise direction of the optical film laminate 15. In the optical film laminate 15, the carrier film 13 is preferably bonded to the optical function film 10 with a pressure-sensitive adhesive layer 11 interposed therebetween.

The optical function film 10 includes a polarizing film including a polarizer and a protective film placed on only one principal surface of the polarizer. The optical function film 10 preferably has a bending rigidity per unit longitudinal length of from $1 \times 10^{-2}$ N·mm² to $1.3 \times 10^{-1}$ N·mm². The optical function film 10 preferably has a thickness of from 10 μm to 90 μm. In an embodiment, the polarizer preferably has a thickness of from 2 μm to 10 μm in view of setting the bending rigidity and thickness of the optical function film within the above ranges. In addition, the polarizer is preferably made of a coating.

In the invention, the bending rigidity $EI_{13}$ of the carrier film 13 per unit longitudinal length is preferably higher than the bending rigidity $EI_{10}$ of the optical function film 10 per unit longitudinal length. The carrier film 13 preferably has a bending rigidity $EI_{13}$ per unit longitudinal length of from $1.7 \times 10^{-2}$ N·mm² to 2 N·mm².

The invention is further directed to a method for manufacturing a liquid crystal display device by feeding the optical film laminate 15 from the continuous roll 50 and bonding the optical function film 10 to a liquid crystal panel W. In an embodiment, the manufacturing method of the invention includes the steps of: feeding the optical film laminate from the continuous roll; peeling off the carrier film from the optical function film; and bonding the optical function film, from which the carrier film is peeled off, to a liquid crystal panel. The step of peeling off the carrier film from the optical function film preferably includes hooking the carrier film on the folding-back part of a peeler plate, folding back the carrier film at an acute angle to turn the direction of the feeding of the carrier film. According to this process, starting from a scored part, the optical function film is peeled off from the carrier film, and the front end (scored part) of the optical function film, from which the carrier film is peeled off, is guided to a laminating device.

The invention is also directed to a continuous laminating device for manufacturing a liquid crystal display device by using the continuous roll and bonding an optical function film to a liquid crystal panel. The continuous laminating device of the invention includes: a supporting unit 212-equipped optical film laminate feeder 201 for continuously feeding the optical film laminate 115 from the continuous roll 150; a carrier film peeling apparatus 204 for peeling off the optical function film from the carrier film and guiding the front end of the optical function film to a bonding unit 205; a bonding unit 205 for bonding the exposed surface of the optical function film, from which the carrier film is peeled off, to the liquid crystal panel W; and a carrier film take-up apparatus 206 for taking up the carrier film after the optical function film is peeled off. The carrier film peeling apparatus 204 includes a peeler plate 230. The peeler plate 230 has a folding-back part 231 and is configured to fold back, at an acute angle, the carrier film hooked on the folding-back part and turn the direction of the feeding of the carrier film so that the optical function film can be peeled off from the carrier film, starting from a scored part.

Effect of the Invention

In the continuous roll of the invention, only the optical function film is divided into cut pieces by the score lines formed along the widthwise direction, and the carrier film is left uncut. Therefore, the process including continuously feeding the optical function film from the continuous roll and continuously bonding the optical function film and the liquid crystal panel together does not need to include the half-cutting step. This can reduce the process time for the bonding of the optical function film and the liquid crystal panel.

In such a scored continuous roll, an unscored part of the optical function film laminate may suffer from a concave-convex deformation and streaky irregularities due to buckling of the optical function film at the position of the score line, when the unscored part of the optical film laminate is wound on the scored part. According to the invention, the bending rigidity $EI_{10}$ of the optical function film 10 per unit longitudinal length falls within the specified range, so that the optical function film is prevented from buckling at the position of the score line even in the process of winding the optical film laminate into a roll. Therefore, even when the optical film laminate is wound on the outer periphery of the scored part of the optical function film, a film deformation that can cause streaky irregularities hardly occurs, so that the yield of liquid crystal display devices each produced by bonding an optical function film and a liquid crystal panel can be increased.

MODE FOR CARRYING OUT THE INVENTION

Hereinafter, embodiments of the invention are described in detail with reference to the drawings.

Figure 1A:
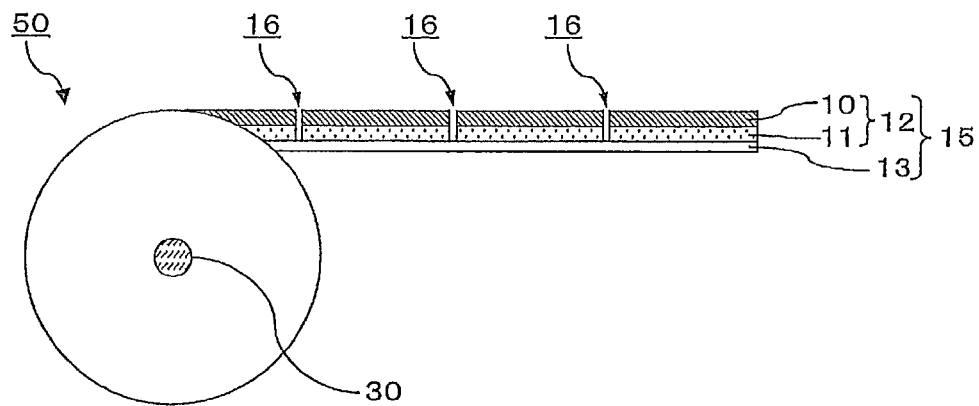
FIG. 1A is a schematic cross-sectional view showing a continuous roll and the cross-sectional structure of an optical film laminate.
Figure 1B:
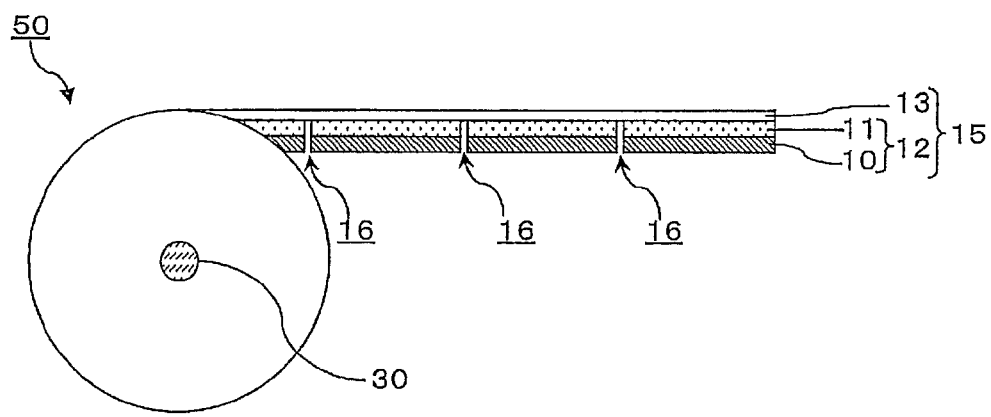
FIG. 1B is a schematic cross-sectional view showing a continuous roll and the cross-sectional structure of an optical film laminate.

FIGS. 1A and 1B are cross-sectional views schematically showing an optical film laminate 15 drawn from the outer periphery of a continuous roll 50 according to the invention. The continuous roll 50 includes the optical film laminate 15, which is in the form of a continuous web and wound into a roll around a core 30 with a predetermined diameter. The optical film laminate 15 includes a carrier film 13 in the forms of a continuous web and cut pieces of an optical function film 10 placed on the carrier film 13. The optical function film 10 is provided with score lines 16 that each extend along the widthwise direction and are formed at predetermine intervals in the longitudinal direction. The score lines divide the optical function film 10 into a plurality of rectangular cut pieces.

The optical function film 10 and the carrier film 13 are releasably laminated. The optical function film 10 may be placed and bonded directly on the carrier film 13. As shown in FIG. 1A or 1B, however, the optical function film is preferably placed on the carrier film 13 with a pressure-sensitive adhesive layer 11 interposed therebetween.

As shown in FIG. 1A, the optical function film 10 may be wound outside the carrier film 13 to form the continuous roll 50, or as shown in FIG. 1B, the optical function film 10 may be wound inside the carrier film 13 to form the continuous roll 50. When the optical function film 10 is wound inside as shown in FIG. 1B, the tightening force of the carrier film 13 pressing on the outside of the optical function film is applied even at the outermost part of the continuous roll, so that the optical function film is prevented from releasing from the carrier film. On the other hand, when the optical function film 10 is wound outside as shown in FIG. 1A, it is preferred that the optical function film should be prevented from releasing from the carrier film, until subjected to the next process, by wrapping the continuous roll or using appropriate release-preventing means.

In the description, the direction of take-up of the film, namely, the side-to-side direction of the extending part of the optical film laminate 15 in the plane of FIG. 1A or 1B is called the "longitudinal direction," and the direction perpendicular to the longitudinal direction, namely, the normal direction of the plane of FIG. 1A or 1B is called the "widthwise direction."

The optical function film 10 includes a polarizing film 20 including a polarizer and a protective film placed on only one principal surface of the polarizer.

Figure 2A:
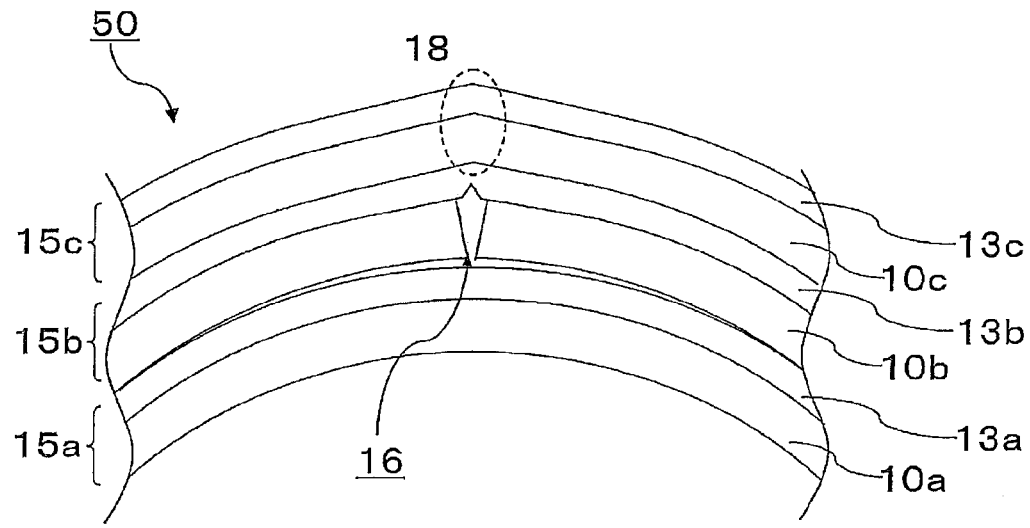
FIG. 2A is a cross-sectional view schematically showing a buckling wrinkle formed on the outer periphery of a score line.
Figure 2B:
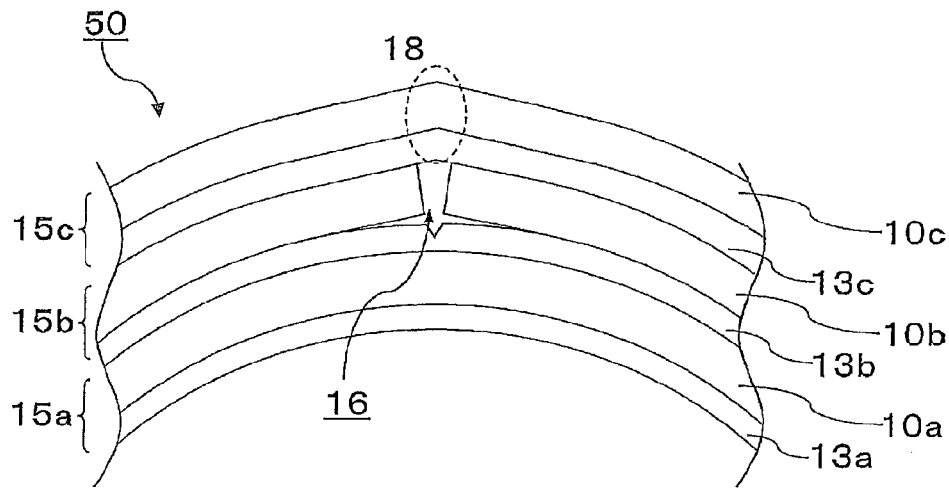
FIG. 2B is a cross-sectional view schematically showing a buckling wrinkle formed on the outer periphery of a score line.

When the optical film laminate 15 is wound into a roll to form the continuous roll 50, bending stress is applied to the optical film laminate, so that the optical film laminate is bent along the core 30 or along its part already wound on the core 30. If the bending rigidity $EI_{10}$ of the optical function film per unit length is too high, the optical function film 10 will resist bending in response to the bending of the carrier film, so that as shown in FIGS. 2A and 2B, the optical function film can easily buckle at the position of the score line 16. Thus, the optical film laminate can be wound on the outer periphery of its part buckling at the position of the score line of the optical function film. In this case, if the part with no score line (unscored part) is overlaid on the score line part, a buckling wrinkle 18 may be formed at the unscored part of the optical film laminate wound on the outer periphery of the buckling part. In the process of forming a liquid crystal display device, therefore, the wrinkle may cause air bubbles to be trapped, so that streaky irregularities may occur. Even when no buckling occurs at the position of the score line 16 during winding, a too high bending rigidity $EI_{10}$ per unit length of the optical function film may cause buckling at the position of the score line during the period until the continuous roll is subjected to the next process, so that a buckling wrinkle may be formed at an unscored part on the outer periphery of the buckling part. Thus, if a long time elapses between winding the optical film laminate into a roll and subjecting the laminate to the process of forming a liquid crystal display device, a buckling wrinkle will tend to more likely to occur.

FIG. 2A shows a case where the optical function film 10 is wound outside the carrier film 13, while FIG. 2B shows a case where the optical function film 10 is wound inside the carrier film 13. In any of these cases, buckling at the position of the score line may cause a buckling wrinkle of an unscored part on the outer periphery of the buckling part.

Figure 3:
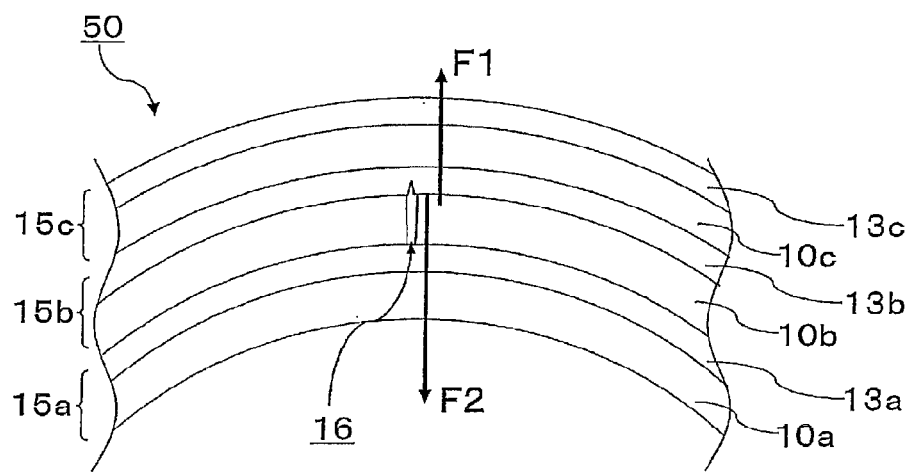
FIG. 3 is a schematic diagram for illustrating a repulsive force caused by the bending elasticity of an optical function film and a tightening force F2 by which an optical film laminate on an outer periphery presses the optical function film.

As shown in FIG. 3, a means of preventing such buckling of the film at the position of the score line includes making F2 higher than F1, wherein F1 is the repulsive force caused by the bending elasticity of an optical function film 10b, and F2 is the tightening force by which the optical film laminate wound on the outer periphery of the optical function film 10b presses the optical function film 10b. A method of increasing the tightening force F2 may include increasing the winding tension in the process of winding the optical film laminate into a roll. Unfortunately, as the winding tension increases, excessive tension-induced deformation of the optical function film tends to occur to reduce the in-plane uniformity of the optical function film.

The tightening force F2 is also determined by the diameter of the continuous roll and the winding tension in the process of winding the optical film laminate into a roll. In order to make the tightening force F2 constant, therefore, it will be necessary to change the winding tension between the inner and outer parts of the continuous roll depending on the diameter of the wound continuous roll, so that the control of the winding tension will tend to be complicated. In addition, if the winding tension is too high, the continuous roll will be tightened by winding, and contrarily, if the winding tension it too low, a problem may occur, such as bending of the end face of the continuous roll being wound. Therefore, if the tension is changed depending on the diameter of the roll, problems with quality may easily occur in the process of winding the film into a roll.

On the other hand, since the repulsive force F1 caused by the bending elasticity of the optical function film 10 is proportional to the bending rigidity $EI_{10}$ of the optical function film 10 per unit length, F1<F2 can also be achieved by reducing the bending rigidity of the optical function film. Using such a method of reducing F1 by reducing the bending rigidity, the optical function film 10 can be prevented from buckling at the position of the score line without problems such as those caused by the method of increasing F2 by controlling the winding tension.

The bending rigidity EI per unit length, which is a measure of the bending resistance of materials, is expressed by the product E×I, wherein E is the longitudinal elastic modulus (Young's modulus), and I is the geometrical moment of inertia per unit length (1 mm). In the case of a shape with a rectangular cross-section, such as a film, the geometrical moment of inertia per unit length is expressed by $I=b \times d^3$ using the thickness d of the film and the unit length b (=1 mm). Therefore, the bending rigidity EI per unit length is proportional to each of the longitudinal elastic modulus of the optical function film 10 and the third power of the thickness d of the optical function film 10.

As the bending rigidity $EI_{10}$ of the optical function film 10 per unit length decreases, the repulsive force F1 caused by the bending elasticity of an optical function film decreases, so that the optical function film becomes easy to bend. This reduces the problem of streaky irregularities caused by buckling at the position of the score line as described above. On the other hand, if $EI_{10}$ is too low, the optical function film 10 will tend to be difficult to be peeled off from the carrier film 13 in the process of bonding the optical function film 10 to a liquid crystal panel W. Specifically, if the bending rigidity $EI_{10}$ of the optical function film 10 is too low in a process including hooking the optical film laminate 15 on an acute angle edge member such as a peeler plate 430 shown in FIG. 8 and turning the direction of the feeding of the carrier film 13, the optical function film 10 may be turned and fed together with the carrier film 13 without being peeled off from the carrier film 13, so that it may fail to be bonded to the liquid crystal panel W.

In view of the above, the bending rigidity $EI_{10}$ of the optical function film 10 per unit length should preferably fall within the specified range. Hereinafter, preferred embodiments are described in detail.

(Optical Function Film)

Figure 6:
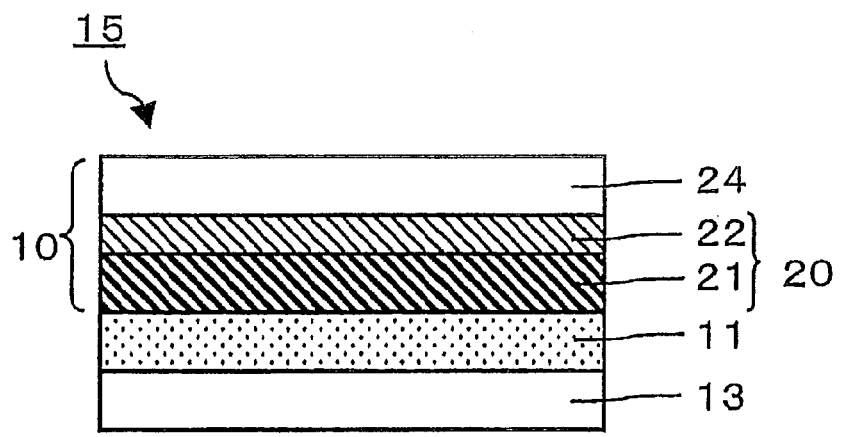
FIG. 6 is a schematic cross-sectional view showing an example of the laminated structure of an optical function film.

As shown in FIG. 6, the optical function film 10 includes a polarizing film 20 including a polarizer 21 and a protective film 22 placed on only one principal surface of the polarizer 21. In view of preventing the buckling of the optical function film 10 at the position of the score line, the bending rigidity $EI_{10}$ of the optical function film per unit length is preferably $1.3 \times 10^{-1}$ N·mm$^2$ or less, more preferably $5 \times 10^{-2}$ N·mm$^2$ or less, even more preferably $2 \times 10^{-2}$ N·mm$^2$ or less.

In the invention, the polarizing film 20 includes the polarizer 21 and the protective film 22 that is placed on only one principal surface of the polarizer 21 to serve as a polarizer-protecting film. In general, when the polarizing film 20 with such a structure is bonded to a liquid crystal panel to form a liquid crystal display device, the principal surface of the polarizing film 20 on the side where the protective film 22 is not placed is bonded to the liquid crystal panel. Therefore, in the optical film laminate 15 including the optical function film 10 and the carrier film 13 placed thereon, the carrier film 13 is placed, as shown in FIG. 6, on the principal surface of the polarizer 21 on the side where the protective film 22 is not placed. In such a structure as shown in FIG. 6, buckling or a dented mark as shown in FIG. 2A to FIG. 5 will tend to be more easily transferred to the polarizer 21 through the carrier film 13 to cause deformation of the polarizer 21 than in the structure shown in FIG. 10 where the protective film 23 is also placed on the carrier film 13-side surface of the polarizer 21. When a liquid crystal display device is formed, such deformation of the polarizer is more likely to be visible in the form of streaky irregularities. Therefore, setting the bending rigidity $EI_{10}$ of the optical function film per unit length within the above range is important for improving the stability of quality and yield.

On the other hand, in the process of bonding the optical function film to a liquid crystal panel, the carrier film and the optical function film should be easily releasable from each other. From this point of view, the bending rigidity $EI_{10}$ of the optical function film per unit length is preferably $1 \times 10^{-2}$ N·mm$^2$ or more, more preferably $1.5 \times 10^{-2}$ N·mm$^2$ or more, even more preferably $2 \times 10^{-2}$ N·mm$^2$ or more.

While the thickness d of the optical function film 10 is not restricted as long as $EI_{10}$ falls within the above ranges, the thickness d is preferably from 10 μm to 90 μm.

Figure 4A:
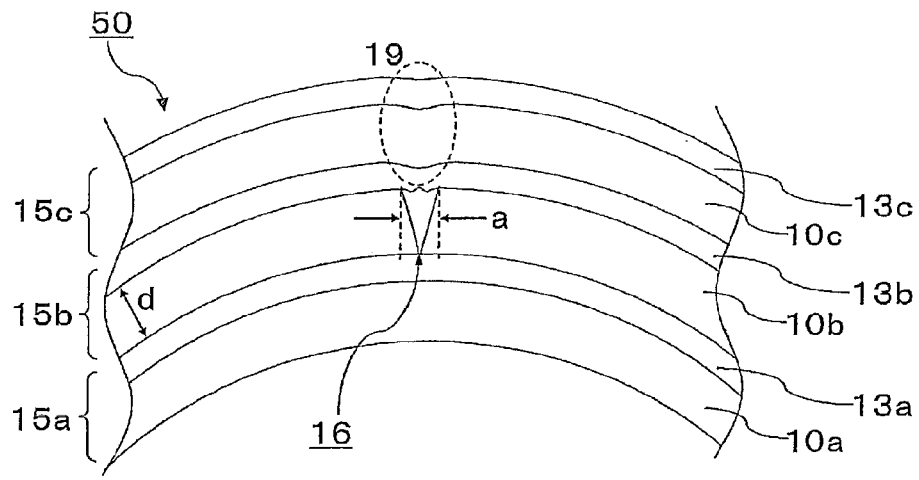
FIG. 4A is a cross-sectional view schematically showing a dented mark formed on the outer periphery of a score line.
Figure 4B:
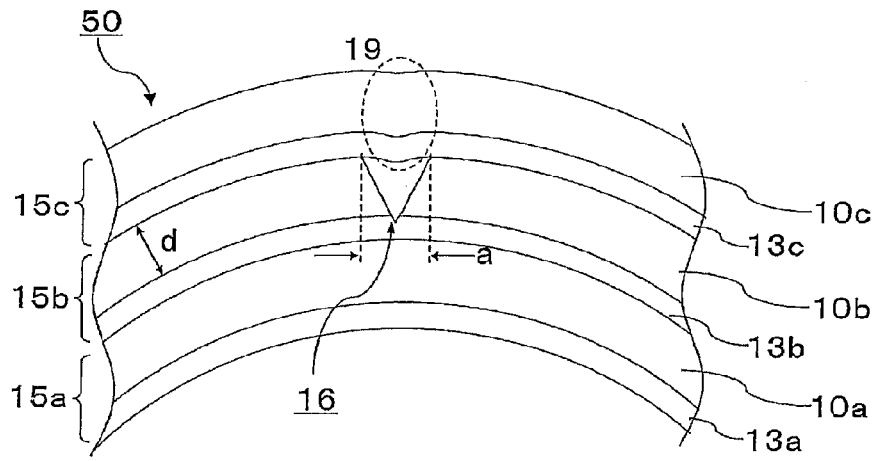
FIG. 4B is a cross-sectional view schematically showing a dented mark formed on the outer periphery of a score line.
Figure 5:
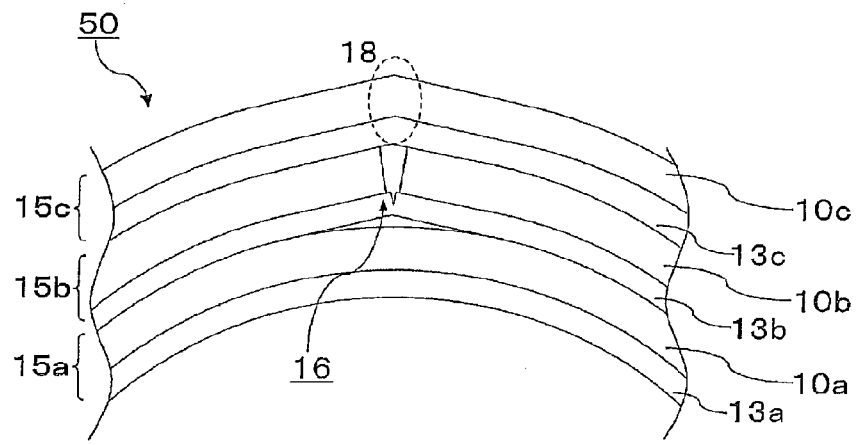
FIG. 5 is a cross-sectional view schematically showing a buckling wrinkle formed on the outer periphery of a score line.

If the thickness d of the optical function film 10 is too large, the length a of the gap at the position of the score line 16 can be large in the optical function film 10a wound into a roll as shown in FIGS. 4A and 4B. Therefore, if an unscored part of the optical film laminate is wound on this part, the tightening force F2 can act to cause a dented mark 20 to occur in a wide region of the unscored part, and the dented mark 20 can cause streaky irregularities in the process of forming a liquid crystal display device.

As mentioned above, the bending rigidity is proportional to the third power of the thickness d. Therefore, as the thickness d of the optical function film increases, the bending rigidity $EI_{10}$ per unit length increases, so that buckling tends to become more likely to occur at the position of the score line. On the other hand, when the thickness d falls within the above ranges, the bending rigidity $EI_{10}$ per unit length can be controlled to fall within a desired range. The thickness of the optical function film is preferably 80 μm or less, more preferably 70 μm or less. On the other hand, if the thickness d of the optical function film 10 is too small, the film will tend to break easily during the feeding of the film. In addition, as the thickness of the optical function film decreases, the bending rigidity $EI_{10}$ of the optical function film per unit length decreases, so that the release of the optical function film from the carrier film tends to become difficult in the process of bonding the optical function film to a liquid crystal panel W.

In general, a widely used polarizing film includes an iodine-dyed polyvinyl alcohol-based polarizer with a thickness of about 20 to about 30 μm and protective films with a thickness of about 40 to about 80 μm which are made of triacetylcellulose or the like and placed on both principal surfaces of the polarizer with adhesive layers interposed therebetween, respectively. It has a thickness of about 110 μm to about 220 μm and a bending rigidity per unit length of about 0.4 N·mm$^2$ to about 3.0 N·mm$^2$. A laminated structure including a polarizer with a thickness of about 20 to about 30 μm as mentioned above and a protective film with a thickness of about 40 to about 80 μm placed on only one principal surface of the polarizer can have a bending rigidity per unit length of about $1.5 \times 10^{-1}$ N·mm² to about $9.0 \times 10^{-1}$ N·mm². Under the circumstances, according to the invention, the thickness or the longitudinal elastic modulus of the polarizer 21 or the protective film 22 may be adjusted so that the whole of the polarizing film can have a relatively low bending rigidity.

(Polarizer)

A polarizer is generally manufactured by a process including iodine-dyeing a polyvinyl alcohol film, while stretching the polyvinyl alcohol film. Examples of methods for making such a film polarizer thin include using a thin polyvinyl alcohol film and setting the stretch ratio high in the process of forming the polarizer. On the other hand, if the polarizer is too thin, it will tend to have low handleability, or the film will tend to break easily in the manufacturing process.

From these points of view, a polarizer formed by coating is also preferably used as the polarizer 21 in the invention. For example, such a coating polarizer may be manufactured by a process including forming a coating film of a solution of a resin such as polyvinyl alcohol on a base film, dyeing, with a dichroic material such as iodine, the coating film formed on the base material, and stretching the coating film.

While any base material may be coated with the resin solution, the base material preferably has self-supporting ability even after stretched and, for example, preferably has a thickness of 100 μm or more before stretched. Any material insoluble in the resin solution may be used to form the base material.

The resin material used to form the coating polarizer is not restricted, and materials conventionally used to form film polarizers, such as polyvinyl alcohol-based resins, are preferably used. A solution of the resin material in an appropriate solvent is applied to the base material and optionally dried, so that a coating film is formed on the base material. When the coating film is stretched together with the base material, the molecules are oriented, and the oriented film forms a polarizer when dyed with a dichroic material such as iodine.

The stretching method is not restricted, and dry stretching may be performed in a heat oven, or wet stretching may be performed in a solution. Stretching and dyeing may be performed in any order, or both may be performed at the same time. Alternatively, the molecular orientation may be achieved by dry stretching, and then dyeing may be performed, which may be followed by wet stretching again.

A crosslinking treatment is also preferably performed in order to fix the orientation of the polymer molecules forming the coating polarizer or prevent the coating film from dissolving in water. In order to prevent unevenness such as dyeing unevenness, the laminate having the formed coating film may also be allowed to swell by immersing it in water or the like before it is dyed. The conditions of each of these processes including swelling, stretching, dyeing, and crosslinking may be appropriately determined according to conventional methods of manufacturing film polarizers.

In this way, a laminate is obtained, in which the coating polarizer is formed on the base material. When a protective film is used as the base material, the laminate may be used as the polarizing film without modification. In this case, the base material serves as the protective film 22. Alternatively, the protective film 22 used to form a laminate may be different from the base material used in forming the polarizer. In this case, the polarizing film including the polarizer 21 and the protective film 22 placed on only one side of the polarizer 21 is preferably formed by a process including providing the laminate including the base material and the coating polarizer formed thereon, placing the protective film on the polarizer-side principal surface of the laminate, and then peeling off the film used as the base material in forming the coating polarizer.

Besides those manufactured by the above methods, examples of coating polarizers that may be used include those containing an oriented dichroic dye having lyotropic liquid crystal properties and those containing a dichroic dye oriented in a homogeneously oriented thermotropic liquid crystal polymer or a homogeneously oriented crosslinking liquid crystal polymer.

Examples of polarizers containing an oriented dichroic dye having lyotropic liquid crystal properties include those disclosed in JP-W-08-511109, JP-W-2002-515075, and JP-W-2006-524348. There is also a commercially available product such as LC Polarizer available from Optiva Inc.

Examples of polarizers containing a dichroic dye oriented in a homogeneously oriented thermotropic liquid crystal polymer or a crosslinking liquid crystal polymer include those disclosed in JP-A-11-101964, JP-A-11-160538, JP-A-2001-330726, JP-A-2001-133630, JP-A-2005-99065, and Nitto Giho Vol. 35, No. 1, p. 79 (1997). Such absorptive polarizers can be obtained by a process including coating a solution of a thermotropic liquid crystal polymer and a dichroic dye onto an alignment base material, heating the coating to the liquid crystal transition temperature or higher, and then cooling the coating to fix the orientation or by a process including coating a mixture of a polymerizable functional group-containing liquid crystal monomer and a dichroic dye onto an alignment base material and polymerizing the liquid crystal monomer by ultraviolet irradiation or the like in the presence of a polymerization initiator or the like.

As compared with a conventional polarizing film having a film polarizer, the polarizing film having such a coating polarizer can be relatively easily made to have a bending rigidity in the above preferred range, because the polarizer is thin. In the invention, when a coating polarizer is used, the thickness of the polarizer is preferably 30 μm or less, more preferably 20 μm or less, even more preferably 10 μm or less. While the lower limit of the thickness of the polarizer is not restricted, the polarizer preferably has a thickness of 2 μm or more in order to increase the in-plane uniformity of the thickness and the optical properties.

Besides by reducing the thickness of the polarizer, the bending rigidity of the optical function film can also be reduced by changing the material for forming the polarizer, the stretch ratio for the polarizer, or other factors so that the longitudinal elastic modulus can be reduced.

(Protective Film)

The bending rigidity $EI_{10}$ of the optical function film 10 per unit length may also be controlled by the thickness or the longitudinal elastic modulus of the protective film 22 to be placed on the polarizer 21. For example, the protective films placed on the polarizer may be preferably those generally used as polarizer-protecting films and having a high level of transparency, mechanical strength, thermal stability, water-blocking properties, etc. Examples of materials that may be used to form the protective films include cellulose resins such as triacetylcellulose, polyester resins, polyether sulfone resins, polysulfone resins, polycarbonate resins, polyamide resins, polyimide resins, polyolefin resins, (meth)acrylic resins, cyclic polyolefin resins (norbornene resins), polyarylate resins, polystyrene resins, polyvinyl alcohol resins, and any mixture thereof. The longitudinal elastic modulus of the protective films can be controlled not only by the resin material used to form the protective films but also by the presence of an additive such as a filler or the stretch ratio for the film.

The thickness of the protective film 22 may be freely determined as long as the bending rigidity of the optical function film per unit length falls within the above range. Generally, in view of strength, workability such as handleability, thin layer formability, or other properties, the thickness of the protective film 22 is preferably from about 4 to about 100 μm, more preferably from 15 to 95 μm, even more preferably from about 30 to about 90 μm.

The polarizer 21 and the protective films 22 are preferably bonded together with an adhesive layer interposed therebetween. Any appropriate adhesive or pressure-sensitive adhesive may be used to form the adhesive layer. For example, the adhesive to be used may be appropriately selected from adhesives containing, as a base polymer, an acryl-based polymer, a silicone-based polymer, polyester, polyurethane, polyamide, polyvinyl ether, a vinyl acetate/vinyl chloride copolymer, modified polyolefin, an epoxy-based polymer, a fluoropolymer, or a rubber-based polymer such as a natural rubber-based polymer or synthetic rubber. Specifically, an aqueous adhesive is preferably used to laminate a polyvinyl alcohol-based polarizer and protective films.

The other surface of the protective film, to which no polarizer is bonded, may be subjected to a hard-coating treatment, an antireflection treatment, an anti-sticking treatment, or a treatment for diffusion or antiglare purpose.

(Surface-Protecting Film)

The optical function film 10 may also have a surface-protecting film 24 on a principal surface where the carrier film 13 is not placed. The surface-protecting film is bonded to prevent scratching or fouling of the film surface in the process of manufacturing the film, the process of bonding the film to a liquid crystal panel, or other processes. In general, the surface-protecting film has a pressure-sensitive adhesive surface, which allows the surface-protecting film to be releasably laminated to the polarizing film or any other part.

For example, a plastic film, a rubber sheet, a paper sheet, a cloth, a nonwoven fabric, a net, a foam sheet, a metal foil, any laminate thereof, or any other appropriate conventional material may be used as the surface-protecting film 24.

The optical function film 10 may also include any of various optical elements such as retardation plates (not shown), which is placed on a side where the polarizer 21 is placed on the carrier film 13. If such an optical element is too thick, the bending rigidity $EI_{10}$ of the optical function film per unit length will be too high, so that in the process of forming the continuous roll, a buckling wrinkle will tend to form at an unscored part due to buckling at the position of the score line. Therefore, a thin optical element is preferably used, such as a coating layer formed on the protective film 23. The thickness of the optical element is preferably 30 μm or less, more preferably 20 μm or less, even more preferably 10 μm or less.

(Pressure-Sensitive Adhesive Layer)

A pressure-sensitive adhesive layer 11 is preferably provided on the principal surface of the optical function film 10 where the carrier film 13 is laminated. The pressure-sensitive adhesive layer 11 is used not only to releasably bond the carrier film 13 onto the optical function film 10 but also to function as a pressure-sensitive adhesive layer for bonding the optical function film 10 to a liquid crystal panel W. For example, the pressure-sensitive adhesive layer 11 may be made of a pressure-sensitive adhesive including, as a base polymer, an acryl-based polymer, a silicone-based polymer, polyester, polyurethane, polyamide, polyether, a fluoropolymer, or a rubber-based polymer.

Any appropriate pressure-sensitive adhesive used for bonding optical function films to liquid crystal panels may be used to form the pressure-sensitive adhesive layer 11. For example, the pressure-sensitive adhesive layer 11 used preferably has a thickness of about 20 to about 25 μm and an anchor strength of about 10 to about 15 N/25 mm to the optical function film.

When the optical function film 10 and the carrier film 13 are laminated with the pressure-sensitive adhesive layer 11 interposed therebetween, the bending rigidity $EI_{12}$ of a laminate 12 of the optical function film 10 and the pressure-sensitive adhesive layer 11 is preferably $1.3 \times 10^{-1}$ N·mm$^2$ or less. In general, the longitudinal elastic modulus of the pressure-sensitive adhesive layer 11 is far lower than the longitudinal elastic modulus of the optical function film such as the polarizing film. Therefore, if the bending rigidity $EI_{10}$ of the optical function film 10 per unit length falls within the above preferred range, $EI_{12}$ will often falls within that range.

The pressure-sensitive adhesive layer 11 can be formed by applying a pressure-sensitive adhesive-containing solvent to the optical function film and drying the coating. Alternatively, the pressure-sensitive adhesive layer 11 can be formed on the optical function film 10 using a carrier film 13 as a transfer medium. Specifically, a pressure-sensitive adhesive-containing solvent may be applied to one release-treated principal surface of the carrier film, and the solvent may be removed by drying, so that the pressure-sensitive adhesive layer 11 can be formed on the carrier film 13. Subsequently, for example, the formed pressure-sensitive adhesive layer 11-bearing carrier film 13 may be fed and laminated to the optical function film 10 being fed in the same manner, so that the pressure-sensitive adhesive layer 11 formed on the carrier film is transferred and placed on the optical function film 10.

(Carrier Film)

The carrier film 13 is provided to prevent scratching or fouling of the surface of the optical function film or to protect the pressure-sensitive adhesive layer 11 in the process of manufacturing the optical function film 10, the process of bonding the optical function film to a liquid crystal panel, or other processes. As regards the invention, such a film for protecting a pressure-sensitive adhesive layer is called "carrier film" because it functions as a medium for carrying the optical function film 10 in the process of bonding the optical function film 10 to a liquid crystal panel, although it is also generally called "release film."

Like the surface-protecting film 24, the carrier film 13 may be an appropriate conventional thin material such as a plastic film, a rubber sheet, a paper sheet, a cloth, a nonwoven fabric, a net, a foam sheet, a metal foil, any laminate thereof, or any other appropriate thin material, which are optionally coated with any appropriate release agent such as a silicone, long-chain alkyl, or fluoride release agent, or molybdenum sulfide.

The bending rigidity $EI_{13}$ of the carrier film 13 per unit length is preferably higher than the bending rigidity $EI_{10}$ of the optical function film 10 per unit length. If $EI_{13} > EI_{10}$ is satisfied, the optical function film 10b can easily follows the bending of the carrier film 13b, so that the optical function film 10 can be prevented from bucking at the position of the score line even when the pressing force F2 applied by the optical film laminate wound on the outer periphery of the score line 16 of the optical function film 10b is lower than the repulsive force F1 caused by the bending elasticity of the optical function film 10b.

Contrarily, if the bending rigidity $EI_{13}$ of the carrier film 13 per unit length is relatively low so that $EI_{13} < EI_{10}$, the carrier film 13 can also easily buckle in response to the buckling of the optical function film 10 at the position of the score line. This may cause a buckling wrinkle to form at the unscored part of the optical film laminate wound on the outer periphery of the buckling part, and the buckling wrinkle may cause streaky irregularities in the process of forming a liquid crystal display device.

From the above points of view, the bending rigidity $EI_{13}$ of the carrier film 13 per unit length is preferably $1.7 \times 10^{-2}$ $N \cdot mm^2$ or more, more preferably $2.2 \times 10^{-2}$ $N \cdot mm^2$ or more, even more preferably $2.7 \times 10^{-2}$ $N \cdot mm^2$ or more. As described above, since the optical function film 10 has no protective film between the polarizer 21 and the carrier film 13, the polarizer 21 tends to be easily deformed due to a buckling wrinkle caused by buckling at the scored part of the optical function film. However, when the bending rigidity $EI_{13}$ of the carrier film 13 is made relatively high, buckling-induced deformation can be prevented from being transferred to the polarizer.

On the other hand, if the bending rigidity $EI_{13}$ of the carrier film 13 per unit length is too high, the optical function film 10 and the carrier film 13 can easily separate from each other in the process of winding the optical film laminate into a roll. In addition, if the winding tension during winding into a roll is set high to prevent such separation, excessive tension-induced deformation of the optical function film will tend to occur to reduce the in-plane uniformity of the optical function film. From these points of view, the bending rigidity $EI_{13}$ of the carrier film 13 per unit length is preferably 2.0 $N \cdot mm^2$ or less, more preferably 1.7 $N \cdot mm^2$ or less, even more preferably 1.5 $N \cdot mm^2$ or less.

For example, when a biaxially-stretched polyethylene terephthalate (PET) film is used as the carrier film 13, the thickness of the carrier film 13 is preferably from about 25 to about 200 μm, more preferably from about 30 to about 150 μm, even more preferably from about 35 to about 100 μm because it has a longitudinal elastic modulus of about 4.5 GPa.

[Manufacture of Continuous Roll]

Score lines 16 are formed in the optical film laminate 15 described above, and the laminate is wound into a roll so that a continuous roll is formed.

(Score Lines)

Score lines 16 are formed along the widthwise direction of the optical film laminate including the optical function film 10 and the carrier film 13 placed on each other, so that a scored optical film laminate is obtained. The score lines 16 are formed from the opposite side of the optical film laminate from the carrier film 13 to such a depth as to reach the optical function film 10 side surface of the carrier film 13 (half-cutting). An optical function film 10-side portion of the carrier film 13 may be partially cut by the score line 16, but the carrier film 13 is not completely cut by the score line 16. Therefore, since the carrier film is not completely cut to keep a continuous web form, the feeding tension from a film feeder is transmitted through the carrier film 13 to the optical function film 10 with the score lines 16. Therefore, even after the optical film laminate 15 is subjected to the half-cutting, the optical function film can be fed with the feeding tension.

The cutting means for forming the score lines may be of any type, and for example, a laser, a cutter, or any other cutting means may be used.

The score lines 16 are sequentially formed at predetermined intervals $L_1$ along the longitudinal direction of the optical film laminate. The interval $L_1$ between the score lines may correspond to the length of the long or short side of an optical display cell, so that an optical film laminate including the carrier film 13 and rectangular cut pieces of the optical function film 10, which are each adjusted to the size of a liquid crystal panel and successively provided on the carrier film 13, can be obtained in the form of a continuous web.

The interval between the score lines 16 does not have to be constant. For example, before score lines are formed, the optical function film may be inspected for any defect. Based on the information about the position of the detected defect, in the region with no defect (non-defective region), score lines 16 may be formed at intervals $L_1$, which correspond to the size of the liquid crystal panel, along the longitudinal direction, and in the defective region, score lines 16 may be formed at an interval different from $L_1$ so that the defective part can be excluded from the non-defective region.

As used herein, the term "defect" or "defective" refers to a part that can cause display failure after the optical function film is bonded to the liquid crystal panel, such as a part containing a foreign body, air bubbles, dirt, or any other foreign matter that should not be an original component of the optical function film; or a deformed part such as dent, scratch, concave-convex defect, twist, or kink. The defect inspection can be made using any appropriate defect detection means such as visual inspection or any known defect detection system.

(Continuous Roll)

The optical film laminate 15 having undergone half-cutting as described above is wound into a roll so that a continuous roll 50 is formed. More specifically, the optical film laminate is wound around a core 30 with a predetermined diameter under a predetermined tension to form a continuous roll.

The core generally has an outer diameter of 70 mm or more, more preferably 150 mm or more. If the outer diameter of the core is too small, the inner part will have a relatively large curvature in the vicinity of the core, so that the optical function film 10 can have a large gap a at the position of the score line or the optical function film 10 can separate from the carrier film 13, which may cause a deformation such as a buckling wrinkle or a dented mark at the unscored part of the optical film laminate 15 wound on the outer periphery, so that streaky irregularities may occur in the process of forming a liquid crystal display device. On the other hand, the outer diameter of the continuous roll after the winding has a certain upper limit, and therefore, if the outer diameter of the core is too large, only a relatively short optical film laminate can be wound around the core. From these points of view, the outer diameter of the core is preferably selected so that the continuous roll obtained by winding the optical film laminate into a roll can have an outer diameter (roll diameter) of 1,500 mm or less, more preferably 1,000 mm or less.

The tension (winding tension) applied to the optical function film in the process of winding it around the core is preferably 50 N/m or more, more preferably 100 N/m or more. If the tension is too low, the film may fail to be successfully wound around the core due to a problem such as bending of the end face of the continuous roll being formed by winding. On the other hand, if the winding tension is too high, the continuous roll may be tightened by the winding, or dented deformation of the optical function film may tend to be significant. Therefore, the winding tension is preferably 300 N/m or less, more preferably 200 N/m or less.

The continuous roll of the invention preferably has a width $L_2$ corresponding to the size of the liquid crystal panel. For example, when the interval $L_1$ in the longitudinal direction between the score lines 16 corresponds to the length of the long side of the liquid crystal panel, the width L2 of the continuous roll preferably corresponds to the length of the short side of the display cell, and when the interval $L_1$ in the longitudinal direction between the score lines 16 corresponds to the length of the short side of the liquid crystal panel, the width L2 of the continuous roll preferably corresponds to the length of the long side of the display cell.

In general, the optical function film and the carrier film are formed wider than the size of the liquid crystal panel. Therefore, the optical film laminate is preferably subjected to slitting so that it can have a predetermined width corresponding to the size of the liquid crystal panel. Such slitting into a predetermined width may be performed before the score lines 16 are formed into the optical film laminate or after the score lines are formed. Alternatively, the continuous roll may also be obtained by a process including temporarily winding a scored wide optical film laminate on a core into a roll, then drawing the optical function film from the wide continuous roll and slitting the film into a predetermined size, and then winding the resulting strip on another core to form a continuous slit roll with the predetermined width.

[Formation of Liquid Crystal Display Device]

The continuous roll of the invention is advantageously used in forming liquid crystal display devices. A liquid crystal display device is formed by a process including feeing the optical film laminate from the continuous roll of the invention, peeling off the carrier film from the optical function film, and bonding the exposed surface of the optical function film to a liquid crystal panel.

Figure 7:
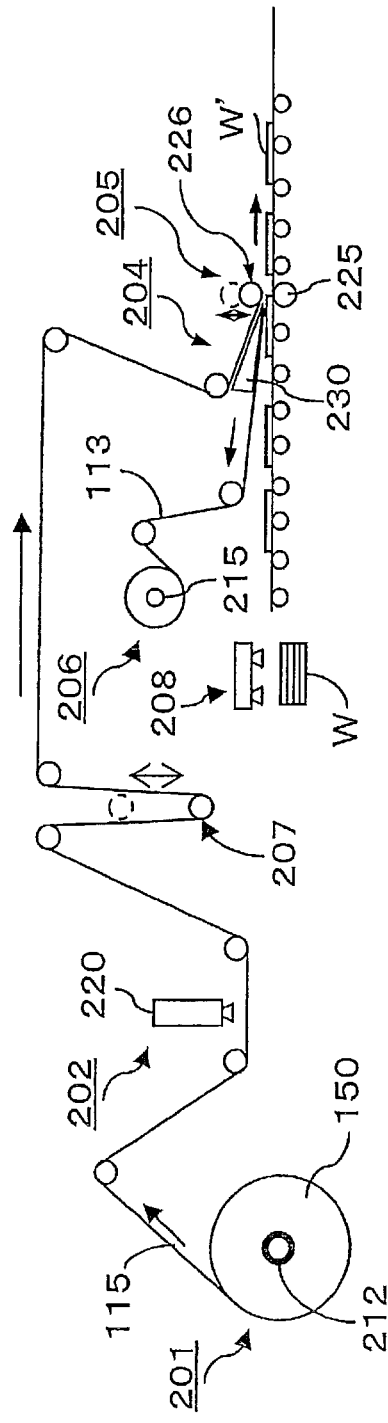
FIG. 7 is a schematic diagram showing an example of the continuous laminating device for unwinding a scored continuous roll and continuously bonding films to liquid crystal panels.

FIG. 7 is a schematic diagram showing an exemplary liquid crystal display device-manufacturing apparatus. Hereinafter, each step is described with reference to appropriate drawings.

The laminating device shown in FIG. 7 is configured to perform a process including feeding an optical film laminate 115, which is in the form of a continuous web, from an optical film laminate feeder 201 to a laminating device 205 for bonding an optical function film to a liquid crystal panel W, feeding the liquid crystal panel W from a liquid crystal panel feeder 208 to the laminating device 205 through another path, and bonding the optical function film to the liquid crystal panel.

In the optical film laminate feeder 201, a continuous roll 150 is mounted on a supporting unit 212 that is geared to a motor or any other part to rotate freely or at a certain speed. The optical film laminate 115 in the form of a continuous web is continuously fed from the continuous roll 150 to the downstream side. The feeder used preferably includes a number of feed rollers and is configured to feed the film along a feed path formed with the feed rollers. The feed path is provided with an inspection apparatus 202, which is optional, a carrier film peeling apparatus 204 for peeling off the optical function film 110 from the carrier film 113 and guiding the front end of the optical function film 110 to the laminating device 205, and a carrier film take-up apparatus 206 for taking up the carrier film 113 from which the optical function film has been peeled off.

The inspection apparatus 202 includes appropriate defect detection means 220 such as means for visual inspection or a known defect detection apparatus. If any defect is detected by the detection means, the information about the position of the defect may be stored in a storage medium, and the defective piece of the optical function film may be controlled so as not to be bonded to the liquid crystal panel W, so that the liquid crystal display device yield can be increased. For example, the defective piece of the optical function film may be bonded to an alternative plate unit (not shown) or taken up on an appropriate roller, so that it can be removed without being bonded to the liquid crystal panel. Alternatively, in the carrier film peeling apparatus 204, the marked piece of the optical function film may be taken up together with the carrier film 113 on a take-up bobbin 215 of the carrier film take-up apparatus 206 without being peeled off from the carrier film 113.

The inspection apparatus 202 may be omitted. If the inspection apparatus 202 is omitted, the optical function film may be inspected for any defect in advance during the formation of the material roll or after the optical function film is bonded to the liquid crystal panel. Marking detection means or score line detection means may also be provided instead of or in addition to the detect detection means.

For example, if any defect is detected in advance during the formation of the continuous roll and a marking is given to the defective part of the continuous roll to be used, marking detection means may be used to detect the information about the position of the marking. Based on the information about the position of the marking, the marked piece of the optical function film, namely, the defective product may be controlled so as not to be bonded to the liquid crystal panel W, so that the liquid crystal display device yield can be increased.

In the non-defective region, score lines may be formed at intervals $L_1$, which correspond to the size of the liquid crystal panel, along the longitudinal direction, and in the defective region, score lines may be formed at an interval different from $L_1$ so that the defective part will be excluded from the non-defective region. If the continuous roll with such score lines is used, score line detection means may be used to detect the score lines, and the distance between the adjacent score lines may be calculated from the coordinates of the score lines along the longitudinal direction. Based on the information about the distance between the score lines, the pieces may be determined to be non-defective if the distance between the score lines is $L_1$, and the other pieces may be determined to be defective, so that the defective piece can be controlled so as not to be bonded to the liquid crystal panel W.

The feed path may also be provided with a speed controller including an accumulator roller 207 and other components. If the speed controller is provided, the supply of the optical film laminate or the supply speed can be stopped or changed upstream or downstream of the speed controller, while a tension is always applied to the optical film laminate on the feed path. For example, therefore, the optical function film can be supplied to the laminating device 405 at a constant speed during the process of bonding the optical function film to the liquid crystal display element, and the supply of the optical function film can be stopped until the next liquid crystal display element W is supplied to the laminating device 405.

Figure 8:
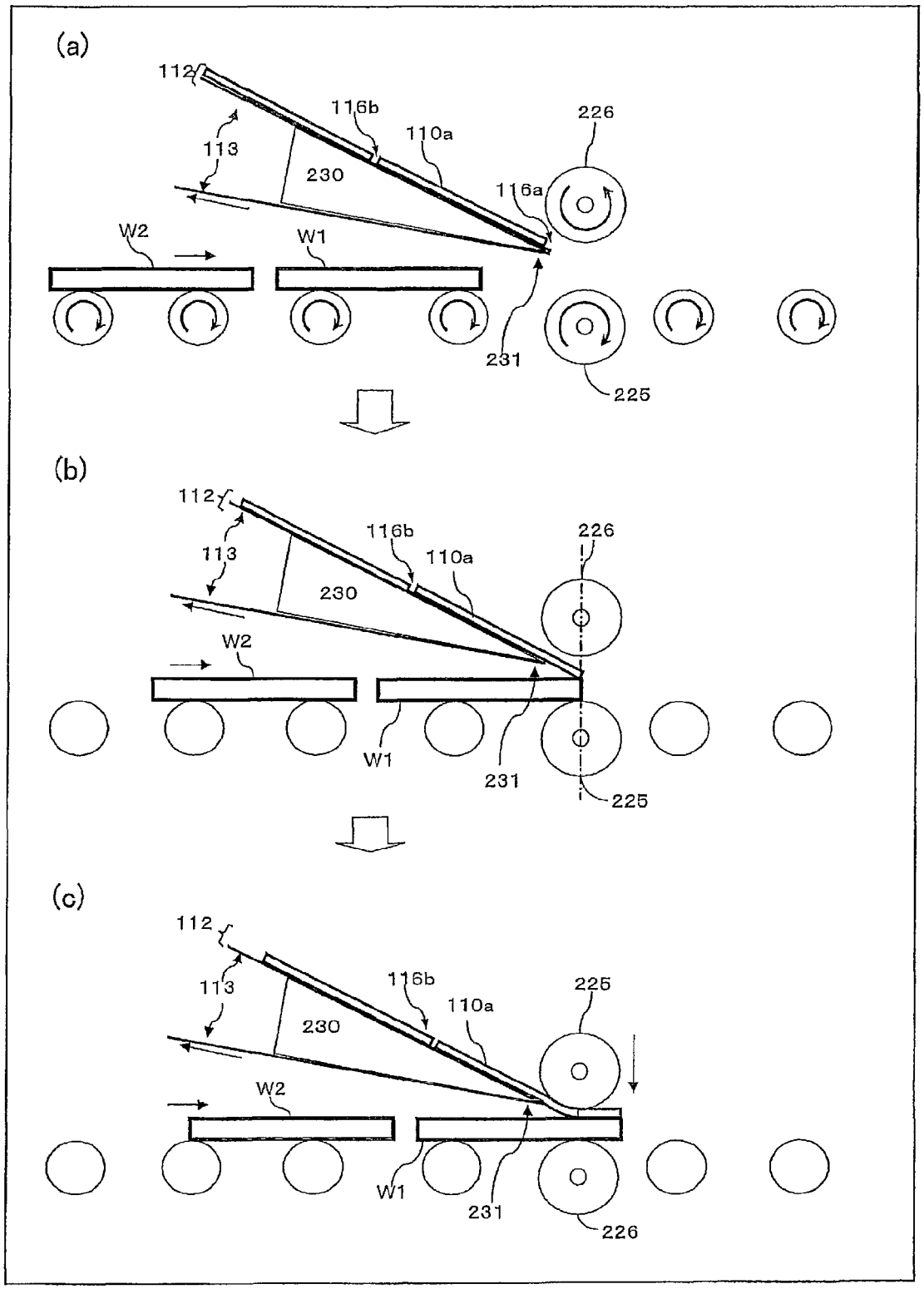
FIG. 8 is a schematic diagram for illustrating an embodiment of the peeling step by a carrier film peeling apparatus and the bonding step by a laminating device.
Figure 9:
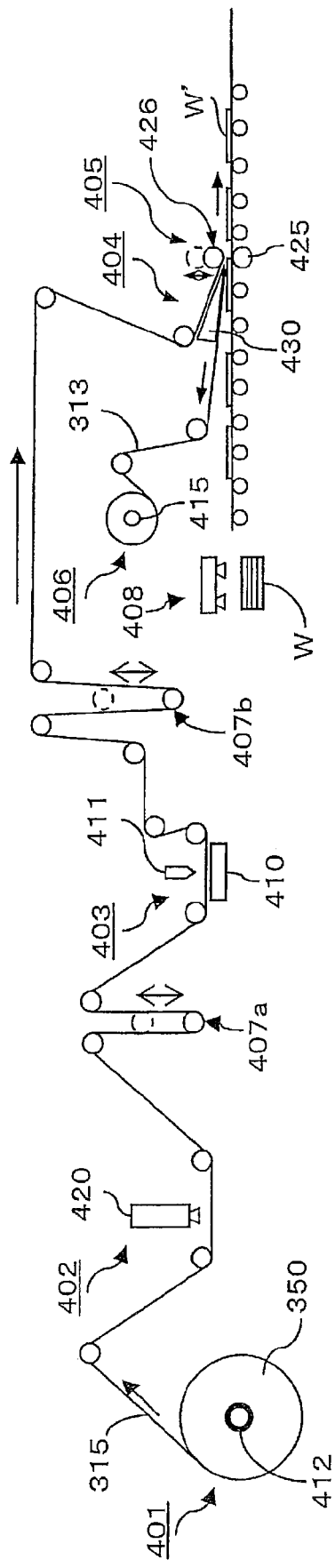
FIG. 9 is a schematic diagram showing an example of the apparatus for unwinding a scored continuous roll and continuously bonding films to liquid crystal panels.

As shown in FIG. 8, the optical film laminate 115 is fed to a position opposed to the liquid crystal panel W in the carrier film peeling apparatus 204. The optical function film 110 is peeled off from the carrier film 113, and the exposed part of the optical function film is bonded to the liquid crystal panel W by the laminating device 205.

The liquid crystal panel W is fed from the liquid crystal panel feeder 208 to the laminating device 205 through a feed path other than that for the optical function film 310. A part of the liquid crystal panel feed path, upstream of the laminating device 205, is arranged to overlap a lower part of the feed path where the optical film laminate 115 is fed to the laminating device 205.

The carrier film peeling apparatus 204 includes a peeler plate 230 having a folding-back part 231 on which the carrier film is to be hooked. The folding-back part 231, which may have a sharp edge shape or a curved surface shape having a specific curvature, is configured to fold back the carrier film at an acute angle. The carrier film 113 of the optical film laminate 115 is hooked on the acute-angle folding-back part 231 of the peeler plate and turned. When the scored part 116a at the front end of the optical function film 110a placed on the carrier film 113 reaches the folding-back part 231 of the peeler plate, only the carrier film 113 is folded back, and turned, and starting from the scored part 116a, the front end of the optical function film 110a is peeled off from the carrier film 113 and guided to the laminating device (part (b) of FIG. 8). When a pressure-sensitive adhesive layer is provided between the optical function film and the carrier film, the pressure-sensitive adhesive layer is also peeled off together with the optical function film from the carrier film.

The score line 116a-side front end of the optical function film 110a, which is peeled off from the carrier film and guided to the laminating device 205, is bonded to one end of the liquid crystal panel W1. The laminating device 205 includes a guide roller 225 and a bonding roller 226 and is so configured that when the liquid crystal panel W1 is fed to the bonding position, the bonding roller 226 is elevated to increase the distance between the rollers (part (a) of FIG. 8). As the liquid crystal panel W1 is fed and as the carrier film 113 is taken up in synchronization therewith, the optical function film 110a peeled off from the carrier film 113 in the form of a continuous web is continuously supplied between the guide roller 225 and the bonding roller 226, so that the bonding roller 226 moves down to provide a pressing force for bonding the optical function film 110a to the upper surface of the liquid crystal panel W1 (part (c) of FIG. 8). Subsequently, while the remaining part of the optical function film 110a still temporarily bonded on the carrier film is peeled off from the carrier film, the exposed surface of the optical function film 110a is bonded to the liquid crystal panel W1, so that the optical function film 110a is completely bonded to the liquid crystal panel W1.

The use of the process described above eliminates the need for handling the optical function film in the form of a cut piece of a specific size and therefore can increase production efficiency. The use of the continuous roll of the invention also eliminates the need for providing a cutting apparatus between the optical film laminate feeder 201 and the carrier film peeling apparatus 204, because the continuous roll of the invention already has score lines that are formed in the optical function film to divide the optical function film into cut pieces of a predetermined size. This can shorten the tact time in the bonding process, so that the productivity of the process of bonding optical function films to liquid crystal panels, respectively, can be increased.

EXAMPLES

Hereinafter, the invention is described with reference to the examples described below, which however are not intended to limit the invention.

Production Examples

Production Example 1A

A 150 μm thick norbornene-based film (ARTON FILM FEKV150D0 (trade name) manufactured by JSR Corporation) was used as a base material. An aqueous solution (10% in solid concentration) of polyvinyl alcohol resin (Gohsenol NH-18 (trade name) manufactured by Nippon Synthetic Chemical Industry Co., Ltd.) was applied to the base material so that a 16.5 μm thick coating could be formed after drying. The coating on the base material was then transversely uniaxially stretched 3.3 times in the widthwise direction at 143° C. using a tenter stretching machine, so that a laminate of the base material and a polyvinyl alcohol film formed thereon was obtained. While the laminate was fed, it was sequentially immersed in four baths under the conditions [1] to [4] below so that swelling, dyeing, crosslinking, and cleaning processes were performed on the polyvinyl alcohol film. As a result, a laminate including the base material and an iodine-dyed polyvinyl alcohol film (polarizer) formed thereon was obtained.

[1] Swelling bath: immersion in pure water at 28° C. for 120 seconds;
[2] Dyeing bath: immersion in an aqueous solution containing 100 parts by weight of water, 1 part by weight of iodine, and 10 parts by weight of potassium iodide at 30° C. for 60 seconds;
[3] Crosslinking bath: immersion in an aqueous solution containing 100 parts by weight of water and 7.5 parts by weight of boric acid at 60° C. for 300 seconds;
[4] Cleaning bath: immersion in pure water for 10 seconds.

The laminate was dried at 50° C. to give a 50 μm thick polarizing film 1A including the 5 μm thick polarizer and the 45 μm thick film placed on one principal surface of the polarizer.

Production Example 1B

While a 60 μm thick polyvinyl alcohol film (PE6000 (trade name) manufactured by KURARAY CO., LTD.) was longitudinally uniaxially stretched using a roller stretching machine, swelling, dyeing, and crosslinking processes were performed on the film at the same time, so that a polarizer was obtained after the stretching 4.5 times in the longitudinal direction. A film (20 μm in thickness) obtained by transversely uniaxially stretching a norbornene-based film (ARTON FILM FEKV150D0 (trade name) manufactured by JSR Corporation) 7.5 times in the widthwise direction was bonded to one principal surface of the polarizer with a polyvinyl alcohol-based adhesive interposed therebetween, and dried at 50° C. The resulting polarizing film 1B had a thickness of 50 μm.

Production Example 1C

Amorphous polyethylene terephthalate (A-PET) resin was subjected to extrusion molding at a molding temperature of 270° C. by a T-die method so that a 200 μm thick base film was obtained. The same aqueous polyvinyl alcohol solution as used in Production Example 1A was applied to the base material so that a 20 μm thick coating could be formed after drying. The coating on the base material was then longitudinally uniaxially stretched 4 times in the longitudinal direction at 100° C. using a roller stretching machine, so that a laminate of the base material and a polyvinyl alcohol film formed thereon was obtained.

A triacetylcellulose film (KC4UYW (trade name) manufactured by Konica Minolta, 40 μm in thickness) was bonded to the polarizer-side principal surface of the laminate with a polyvinyl alcohol-based adhesive interposed therebetween, and dried at 50° C. Subsequently, the polyethylene terephthalate film used as the base material was peeled off from the laminate, so that a 50 μm thick polarizing film 1C was obtained, which included the 10 μm thick polarizer and the 40 μm thick film placed on one principal surface of the polarizer.

Production Example 1D

A 30 μm thick polarizer was prepared as in Production Example 1B, and a film (50 μm in thickness) obtained by transversely uniaxially stretching a norbornene-based film (ARTON FILM FEKV150D0 (trade name) manufactured by JSR Corporation) 3 times in the widthwise direction was bonded to one principal surface of the polarizer with a polyvinyl alcohol-based adhesive interposed therebetween, and dried at 50° C. The resulting polarizing film 1D had a thickness of 80 μm.

Production Example 1E

The same aqueous polyvinyl alcohol solution as used in Production Example 1A was applied to the same 150 μm thick base material as used in Production Example 1A so that a 7.8 μm thick coating could be formed after drying. The coating on the base material was then transversely uniaxially stretched 1.6 times in the widthwise direction at 143° C. using a tenter stretching machine, so that a laminate of the base material and a polyvinyl alcohol film formed thereon was obtained.

While the laminate was fed, swelling, dyeing, crosslinking, and cleaning processes were performed on the polyvinyl alcohol film as in Production Example 1A. Subsequently, the laminate was dried at 50° C. to give a 100 μm thick polarizing film 1E including the 5 μm thick polarizer and the 95 μm thick film placed on one principal surface of the polarizer.

Production Example 1F

A 25.5 μm thick polarizer was prepared as in Production Example 1B, except that the stretch ratio in the longitudinal direction was changed to 5.5 times. A polyethylene terephthalate film (LUMIRROR F57 (trade name) manufactured by TORAY INDUSTRIES, INC., 4.5 μm in thickness) was bonded to one principal surface of the polarizer with a polyvinyl alcohol-based adhesive interposed therebetween, and dried at 50° C. The resulting polarizing film 1F had a thickness of 30 μm.

Production Example 1G

The same aqueous polyvinyl alcohol solution as used in Production Example 1A was applied to the same 200 μm thick base material as used in Production Example 1C so that a 5 μm thick coating could be formed after drying. The coating on the base material was then longitudinally uniaxially stretched 6.3 times in the longitudinal direction at 100° C. using a roller stretching machine, so that a laminate of the base material and a polyvinyl alcohol film formed thereon was obtained.

While the laminate was fed, swelling, dyeing, crosslinking, and cleaning processes were performed on the polyvinyl alcohol film as in Production Example 1A. As a result, a laminate including the base material and an iodine-dyed polyvinyl alcohol film (polarizer) formed thereon was obtained.

A film (28 μm in thickness) obtained by transversely uniaxially stretching a norbornene-based film (ARTON FILM FEKV150D0 (trade name) manufactured by JSR Corporation) 5.4 times in the widthwise direction was bonded to the polarizer-side principal surface of the laminate with a polyvinyl alcohol-based adhesive interposed therebetween, and dried at 50° C. Subsequently, the polyethylene terephthalate film used as the base material was peeled off from the laminate, so that a 30 μm thick polarizing film 1G was obtained, which included the 2 μm thick polarizer and the 28 μm thick film placed on one principal surface of the polarizer.

Production Example 1H

A 30 μm thick polarizer was prepared as in Production Example 1B, and a film (50 μm in thickness) obtained by transversely uniaxially stretching a norbornene-based film (ZEONOR FILM ZB14-55/135 (trade name) manufactured by ZEON CORPORATION) 1.4 times in the widthwise direction was bonded to one principal surface of the polarizer with a polyvinyl alcohol-based adhesive interposed therebetween, and dried at 50° C. The resulting polarizing film 1H had a thickness of 80 μm.

Production Example 1I

The same aqueous polyvinyl alcohol solution as used in Production Example 1A was applied to the same 200 μm thick base material as used in Production Example 1C so that a 30 μm thick coating could be formed after drying. The coating on the base material was then longitudinally uniaxially stretched 2.3 times in the longitudinal direction at 100° C. using a roller stretching machine, so that a laminate of the base material and a polyvinyl alcohol film formed thereon was obtained.

While the laminate was fed, swelling, dyeing, crosslinking, and cleaning processes were performed on the polyvinyl alcohol film as in Production Example 1A. As a result, a laminate including the base material and an iodine-dyed polyvinyl alcohol film (polarizer) formed thereon was obtained.

A triacetylcellulose film (KC4UYW (trade name) manufactured by Konica Minolta, 40 μm in thickness) was bonded to the polarizer-side principal surface of the laminate with a polyvinyl alcohol-based adhesive interposed therebetween, and dried at 50° C. Subsequently, the polyethylene terephthalate film used as the base material was peeled off from the laminate, so that a 60 μm thick polarizing film 1I was obtained, which included the 20 μm thick polarizer and the 40 μm thick film placed on one principal surface of the polarizer.

Production Example 2A

The same aqueous polyvinyl alcohol solution as used in Production Example 1A was applied to the same 200 μm thick base material as used in Production Example 1C so that a 10 μm thick coating could be formed after drying. The coating on the base material was then longitudinally uniaxially stretched 4 times in the longitudinal direction at 100° C. using a roller stretching machine, so that a laminate of the base material and a polyvinyl alcohol film formed thereon was obtained.

While the laminate was fed, swelling, dyeing, crosslinking, and cleaning processes were performed on the polyvinyl alcohol film as in Production Example 1A. As a result, a laminate including the base material and an iodine-dyed polyvinyl alcohol film (polarizer) formed thereon was obtained.

A triacetylcellulose film (KC4UYW (trade name) manufactured by Konica Minolta, 40 μm in thickness) was bonded to the polarizer-side principal surface of the laminate with a polyvinyl alcohol-based adhesive interposed therebetween, and dried at 50° C. Subsequently, the polyethylene terephthalate film used as the base material was peeled off from the laminate. A film (35 μm in thickness) obtained by transversely uniaxially stretching a norbornene-based film (ZEONOR FILM ZB14-55/135 (trade name) manufactured by ZEON CORPORATION) 2 times in the widthwise direction was bonded to the exposed surface of the polarizer with a polyvinyl alcohol-based adhesive interposed therebetween, and dried at 50° C. The resulting polarizing film 2A had a thickness of 80 μm.

Production Example 2B

The same aqueous polyvinyl alcohol solution as used in Production Example 1A was applied to the same 200 μm thick base material as used in Production Example 1C so that a 30 μm thick coating could be formed after drying. The coating on the base material was then longitudinally uniaxially stretched 2.3 times in the longitudinal direction at 100° C. using a roller stretching machine, so that a laminate of the base material and a polyvinyl alcohol film formed thereon was obtained.

While the laminate was fed, swelling, dyeing, crosslinking, and cleaning processes were performed on the polyvinyl alcohol film as in Production Example 1A. As a result, a laminate including the base material and an iodine-dyed polyvinyl alcohol film (polarizer) formed thereon was obtained.

A triacetylcellulose film (KC4UYW (trade name) manufactured by Konica Minolta, 40 μm in thickness) was bonded to the polarizer-side principal surface of the laminate with a polyvinyl alcohol-based adhesive interposed therebetween, and dried at 50° C. Subsequently, the polyethylene terephthalate film used as the base material was peeled off from the laminate. A film (20 μm in thickness) obtained by transversely uniaxially stretching a norbornene-based film (ZEONOR FILM ZB14-55/135 (trade name) manufactured by ZEON CORPORATION) 3.5 times in the widthwise direction was bonded to the exposed surface of the polarizer with a polyvinyl alcohol-based adhesive interposed therebetween, and dried at 50° C. The resulting polarizing film 2B had a thickness of 80 μm.

[Carrier Films]

The carrier films shown below were used.

Carrier film A: a 150 μm thick film obtained by subjecting amorphous polyethylene terephthalate (A-PET) resin to T-die extrusion molding at a molding temperature of 270° C.

Carrier film B: a 100 μm thick film obtained by subjecting amorphous polyethylene terephthalate (A-PET) resin to T-die extrusion molding at a molding temperature of 270° C.

Carrier film C: a 170 μm thick film obtained by subjecting amorphous polyethylene terephthalate (A-PET) resin to T-die extrusion molding at a molding temperature of 270° C.

Carrier film D: a 200 μm thick film obtained by subjecting amorphous polyethylene terephthalate (A-PET) resin to T-die extrusion molding at a molding temperature of 270° C.

Carrier film E: a 38 μm thick, biaxially-stretched polyethylene terephthalate film (Diafoil MRF38CK (trade name) manufactured by Mitsubishi Chemical Polyester Co., Ltd.

Carrier film F: a 75 μm thick, biaxially-stretched polyethylene terephthalate film (Diafoil MRF75CK (trade name) manufactured by Mitsubishi Chemical Polyester Co., Ltd.

[Measurement of the Bending Rigidity of Films]

The bending rigidity of each film described above was measured by the method described below.

The optical function film was cut into a 25 mm×200 mm strip-shaped sample with its long side in the longitudinal direction of the film, and the width and thickness of the sample were measured using a vernier caliper and a digital thickness gauge, respectively. Subsequently, a tensile test was performed on the sample at a chuck-chuck distance of 150 mm and a displacement rate of 1 mm/minute using an autograph manufactured by Shimadzu Corporation. The displacement amount and the load were measured during the tensile test, and the longitudinal elastic modulus was calculated from the stress-strain curve.

Examples, Comparative Examples, and Reference Examples

According to the combination shown in Table 1, the optical function film (polarizing film) and the carrier film were laminated to form an optical film laminate.

Examples 1 to 10 and Comparative Examples 1 to 3

The surface of the carrier film was subjected to a release treatment, and a 20 μm thick pressure-sensitive adhesive layer was formed on the release-treated surface, so that a pressure-sensitive adhesive layer-carrying carrier film was formed. Using a roller laminator, the carrier film was bonded to the exposed surface of the polarizer of each of the polarizing films 1A to 1I to form an optical film laminate. Subsequently, both transverse ends of the optical film laminate were subjected to slitting so that its width was reduced to 400 mm, and the laminate was then wound into a roll so that an unscored continuous roll was obtained.

While the optical film laminate was drawn from the continuous roll, score lines were sequentially formed along the widthwise direction at a pitch of 700 mm in the longitudinal direction. The laminate was then wound on a core with an outer diameter of 91 mm into a roll in such a manner that the optical function film was placed inside while the carrier film was placed outside, so that a scored continuous roll was obtained. In the process of forming score lines, half-cutting was performed in such a manner that the optical function film and the adhesive layer were cut, while the carrier film was left uncut.

Reference Examples 1 and 2

A pressure-sensitive adhesive layer-carrying carrier film was prepared as in the examples and the comparative examples. The pressure-sensitive adhesive layer-carrying carrier film was bonded to the norbornene-based film-side principal surface of the polarizing film 2A or 2B obtained in the above production example, so that an optical film laminate was obtained. Subsequently, the optical film laminate was formed into a scored continuous roll as in the examples and the comparative examples.

(Bonding Test)

After the scored continuous roll of each of the examples, the comparative examples, and the reference examples was wound into a roll, the roll was allowed to stand in a clean room (20-25° C., humidity 60-70% RH) for 10 hours and then subjected to a bonding test. The continuous roll of each of the examples, the comparative examples, and the reference examples was mounted on the supporting unit 212 of the laminating device shown in FIG. 7, and a non-alkali glass plate (manufactured by Corning Incorporated) with a length of 710 mm and a width of 405 mm was used as a cell W. A test was performed, in which the polarizing film and the glass plate were bonded together, while the film was fed from the supporting unit and while the carrier film was peeled off from the polarizing film by hooking the carrier film on the folding-back part of the peeler plate and turning the direction of the feeding of the carrier film.

On the other hand, the scored continuous roll of each of the examples, the comparative examples, and the reference examples after the winding was allowed to stand in a clean room (20-25° C., humidity 60-70% RH) for 24 hours. Subsequently, the bonding test was performed in the same manner. In each of the cases of standing for 10 hours and standing for 24 hours, 100 pieces of the film were successively bonded, and the failure rate was determined in each of the evaluations described below.

(Evaluation Items)

<Peeling Failure>

The peeling failure occurs when the carrier film is not peeled off from the polarizing film at the peeling unit so that the polarizing film is folded back together with the carrier film at the peeler plate and therefore is not bonded to the glass plate.

<Breakage of Polarizing Film>
The breakage of the polarizing film occurs in the optical function film feed path or in the bonding unit.
<Occurrence of Streaky Irregularities>
When the sample including the glass plate and the polarizing film bonded thereon is observed visually, trapping of air bubbles is observed in the form of streaks.
<Occurrence of Unevenness>
A polarizing film (NPF VEG1724DU manufactured by NITTO DENKO CORPORATION) is placed on a backlight, and the sample including the glass plate and the polarizing film bonded thereon is placed on the above polarizing film in such a manner that the glass plate side is located on the backlight side and that the absorption axes of the two polarizing films are perpendicular to each other. A visual observation is made to determine whether unevenness is observed.

the incidence of streaky irregularities increased twice or more when the standing time period was prolonged to 24 hours, although the incidence of streaky irregularities was suppressed to less than 10% when the standing time period was 10 hours.

Figure 10:
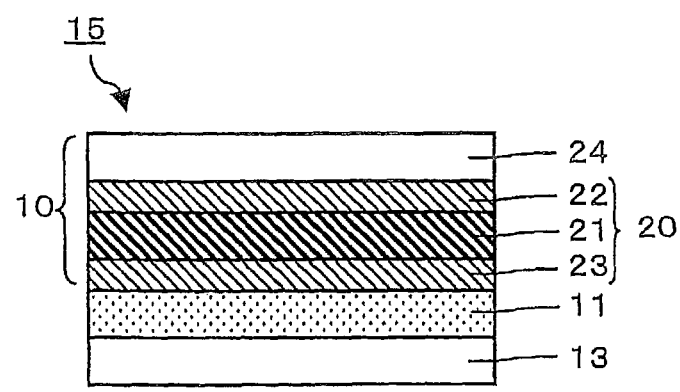
FIG. 10 is a schematic cross-sectional view showing the structure of an optical film laminate including a polarizing film composed of a polarizer and a protective film placed on only one principal surface of the polarizer.

On the other hand, in Reference Examples 1 and 2, no streaky irregularities occurred even though the bending rigidity of the optical function film per unit length exceeded 1.3× $10^{-1}$ N·mm². This is considered to be because as shown in FIG. 10, the polarizing film 2A or 2B has a structure in which the protective film 23 is also placed on the carrier film 13-side principal surface of the polarizer 21, so that streaky irregularities are less likely to occur in such a structure than in the structure where the protective film is placed on only one principal surface of the polarizer. It is therefore apparent that it is more important to set the bending rigidity of the optical

TABLE 1

| | | Polarizing plate | | | Carrier film | Bonding test results | | | |
|---|---|---|---|---|---|---|---|---|---|
| | | | | | | Incidence (%) | Polarizing | | Incidence (%) |
| | Type | $EI_{10}$ (N·mm²) | d (μm) | Type | $EI_{13}$ (N·mm²) | of streaky irregularities | plate breakage percentage (%) | Peeling failure rate (%) | of retardation unevenness |
| Example 1 | 1A | $1.6 \times 10^{-2}$ | 50 | A | 1.1 | 0/0 | 0/0 | 0/0 | 0/0 |
| Example 2 | 1B | $4.4 \times 10^{-2}$ | 50 | A | 1.1 | 0/0 | 0/0 | 0/0 | 0/0 |
| Example 3 | 1C | $8.0 \times 10^{-2}$ | 50 | A | 1.1 | 0/0 | 0/0 | 0/0 | 0/0 |
| Example 4 | 1D | $1.0 \times 10^{-1}$ | 80 | A | 1.1 | 0/0 | 0/0 | 0/0 | 0/0 |
| Example 5 | 1E | $1.0 \times 10^{-1}$ | 100 | A | 1.1 | 2/3 | 0/0 | 0/0 | 0/0 |
| Example 6 | 1F | $2.4 \times 10^{-2}$ | 30 | B | $3.0 \times 10^{-1}$ | 0/0 | 0/0 | 0/0 | 0/0 |
| Example 7 | 1F | $2.4 \times 10^{-2}$ | 30 | F | $1.4 \times 10^{-1}$ | 0/0 | 0/0 | 0/0 | 0/0 |
| Example 8 | 1F | $2.4 \times 10^{-2}$ | 30 | C | 1.6 | 0/0 | 0/0 | 0/0 | 1/1 |
| Example 9 | 1F | $2.4 \times 10^{-2}$ | 30 | D | 2.6 | 0/0 | 0/0 | 0/0 | 2/2 |
| Example 10 | 1F | $2.4 \times 10^{-2}$ | 30 | E | $1.8 \times 10^{-2}$ | 2/3 | 0/0 | 0/0 | 0/0 |
| Comparative Example 1 | 1G | $4.5 \times 10^{-3}$ | 30 | A | 1.1 | 0/0 | 0/0 | 25/27 | 0/0 |
| Comparative Example 2 | 1H | $1.9 \times 10^{-1}$ | 80 | A | 1.1 | 8/18 | 0/0 | 0/0 | 0/0 |
| Comparative Example 3 | 1I | $1.5 \times 10^{-1}$ | 60 | A | 1.1 | 6/15 | 0/0 | 0/0 | 0/0 |
| Reference Example 1 | 2A | $1.4 \times 10^{-1}$ | 80 | A | 1.1 | 0/0 | 0/0 | 0/0 | 0/0 |
| Reference Example 2 | 2B | $3.0 \times 10^{-1}$ | 80 | A | 1.1 | 0/0 | 0/0 | 0/0 | 0/0 |

Table 1 shows the components of the optical function film in each of the examples and the comparative examples and the evaluation results in the bonding test. As regards the results of the bonding test in Table 1, the results of standing for 10 hours and standing for 24 hours are shown in the left and right sides, respectively, such as "the percent defective after standing for 10 hours/the percent defective after standing for 24 hours."

Comparison Between the Respective Examples, Comparative Examples, and Reference Examples The result of a comparison between Examples 1 to 3 and Comparative Examples 1 to 3 is as follows. In Examples 1 to 3 where the bending rigidity of the polarizing film per unit length falls within the range of $1 \times 10^{-2}$ N·mm² to $1.3 \times 10^{-1}$ N·mm², no streaky irregularities occurred, and the peeling off of the polarizing film from the carrier film did not fail. On the other hand, in Comparative Example 1 where the bending rigidity $EI_{10}$ of the polarizing film per unit length is relatively low, the failure rate in the process of peeling off the polarizing film from the carrier film increased sharply, although no streaky irregularities were observed. It is also apparent that in Comparative Examples 2 and 3 where the bending rigidity $EI_{10}$ of the polarizing film per unit length is relatively high, function film per unit length at a lower level in the structure where the protective film 22 is placed on only one principal surface of the polarizer 21 as shown in FIG. 6.

As a result of a comparison between Examples 4 and 5 with substantially the same bending rigidity per unit length of the optical function film, no streaky irregularities were observed in Example 4, but streaky irregularities occurred in Example 5 where the thickness of the optical function film exceeded 90 μm. However, the incidence of streaky irregularities was lower in Example 5 than in Comparative Example 2 or 3, and the incidence of streaky irregularities after standing for 24 hours did not increase sharply in Example 5. This indicates that setting the bending rigidity of the optical function film within the specified range is more important for preventing streaky irregularities although the thickness of the optical function film is also related to the occurrence of streaky irregularities.

As a result of a comparison between Examples 6 to 10 all using the polarizing film 1F, neither streaky irregularities nor retardation unevenness was observed in Examples 6 and 7, but streaky irregularities occurred in Example 10 where the carrier film E used had a relatively low bending rigidity $EI_{13}$. However, the incidence of streaky irregularities was lower in Example 10 than in Comparative Example 2 or 3, and the incidence of streaky irregularities after standing for 24 hours did not increase sharply in Example 10. This indicates that setting the bending rigidity of the optical function film within the specified range is more important for preventing streaky irregularities although the bending rigidity of the carrier film is also related to the occurrence of streaky irregularities. On the other hand, when a certain type of polarizing film was used, such as in Example 8 or 9 where the carrier film C or D used had a relatively high bending rigidity $EI_{13}$, retardation unevenness was observed, although no streaky irregularities were observed. However, the incidence of such retardation unevenness was low, and the incidence did not increase sharply with changing the standing time period, which is considered to be a practically acceptable level.

As is evident from the examples described above, scored continuous rolls in which the bending rigidity of the optical function film per unit longitudinal length is within the specified range are prevented from causing scored part-induced streaky irregularities even when allowed to stand in the roll form for a long time, and also suitable for successive bonding to liquid crystal panels.

DESCRIPTION F REFERENCE SIGNS 10 optical function film
11 pressure-sensitive adhesive layer
13 carrier film
15 optical film laminate
16 score line
21 polarizer
22, 23 protective film
24 surface-protecting film
30 core
50 continuous roll
110, 310 optical function film
113, 313 carrier film
115, 315 optical film laminate
16, 116 score line
150, 350 continuous roll
201, 401 optical film laminate feeder
202, 402 inspection apparatus
403 cutting apparatus
204, 404 carrier film peeling apparatus
205, 405 laminating device
206, 406 carrier film take-up apparatus
207, 407 accumulator roller
208, 408 liquid crystal panel feeder
212, 412 supporting unit
215, 415 take-up bobbin
220 defect detection means
225, 425 guide roller
226, 426 bonding roller
230, 430 peeler plate
W liquid crystal panel

The invention claimed is:

1. A continuous roll, comprising:
    an optical film laminate that is in the form of a continuous web wound into a roll in a longitudinal direction of said optical film laminate, and comprises at least an optical function film and a carrier film releasably placed on the optical function film,
    wherein the optical function film includes a polarizing film comprising a polarizer and a protective film placed on only one principal surface of the polarizer,
    wherein the optical function film is divided into a plurality of cut pieces by score lines formed along a widthwise direction of the optical film laminate, and
    wherein the optical function film has a bending rigidity per unit longitudinal length of from $1\times10^{-2}$ N·mm$^2$ to $1.3\times10^{-1}$ N·mm$^2$.

2. The continuous roll according to claim 1, wherein the optical film laminate further comprises a pressure-sensitive adhesive layer with which the carrier film is bonded to the optical function film.

3. The continuous roll according to claim 1, wherein the optical function film has a thickness of from 10 μm to 90 μm.

4. The continuous roll according to claim 1, wherein the polarizer has a thickness of from 2 μm to 10 μm.

5. The continuous roll according to claim 1, wherein the polarizer is made of a coating.

6. The continuous roll according to claim 1, wherein the bending rigidity of the carrier film per unit longitudinal length is higher than the bending rigidity of the optical function film per unit longitudinal length.

7. The continuous roll according to claim 6, wherein the carrier film has a bending rigidity per unit longitudinal length of from $1.7\times10^{-2}$ N·mm$^2$ to 2 N·mm$^2$.

8. A method for manufacturing a liquid crystal display device by bonding an optical function film and a liquid crystal panel together, comprising the steps of:
    feeding the optical film laminate from the continuous roll according to claim 1;
    peeling off the carrier film from the optical function film; and
    bonding an exposed surface of the optical function film, from which the carrier film is peeled off, to the liquid crystal panel.

9. The method according to claim 8, wherein the step of peeling off the carrier film from the optical function film includes hooking the carrier film on a peeler plate with an acute angle edge, folding back the carrier film at an acute angle to turn the direction of the feeding of the carrier film, and peeling off the optical function film from the carrier film, starting from a scored part.

10. A laminating device for manufacturing a liquid crystal display device, comprising:
    an optical film laminate feeder for continuously feeding an optical film laminate from the continuous roll according to claim 1;
    a carrier film peeling apparatus for peeling off the optical function film from the carrier film and guiding a front end of the optical function film, from which the carrier film is peeled off, to a bonding unit;
    a bonding unit for bonding an exposed surface of the optical function film, from which the carrier film is peeled off, to a liquid crystal panel; and
    a carrier film take-up apparatus for taking up the carrier film after the optical function film is peeled off,
    wherein the carrier film peeling apparatus includes a peeler plate having a folding-back part on which the carrier film is to be hooked, and
    the peeler plate is configured to fold back the carrier film at an acute angle at the folding-back part and turn the direction of the feeding of the carrier film so that the optical function film can be peeled off from the carrier film, starting from a scored part.

* * * * *